United States Patent [19]

Rigazio et al.

[11] Patent Number: 4,857,758
[45] Date of Patent: Aug. 15, 1989

[54] CYCLE TIMER FOR HOUSEHOLD APPLIANCE

[75] Inventors: Anthony W. Rigazio, Oglesby; Gerald C. Koehler, Peru, both of Ill.

[73] Assignee: Worldtronics International, Oglesby, Ill.

[21] Appl. No.: 179,410

[22] Filed: Apr. 8, 1988

[51] Int. Cl.⁴ .................................. H01H 43/00
[52] U.S. Cl. ................................ 307/140; 307/141;
307/132 E; 307/141.4; 219/302; 99/285;
99/280; 99/286; 361/72; 361/73; 368/82;
200/38 R
[58] Field of Search ........ 307/132 R, 132 E, 132 EA,
307/132 A, 141, 141.4, 141.8, 140; 219/492,
302, 308, 334; 99/281, 282, 283, 284, 285, 286,
287, 288, 289, 323.7, 327, 325, 332, 335; 200/37
R, 37 A, 38 R, 38 F, 38 FA, 38 A, 38 B, 38 BA,
38 C, 38 CA, 38 D, 38 DA, 38 DB, 38 E, 38
DA; 368/9, 10, 82

[56] References Cited

U.S. PATENT DOCUMENTS

| | | | |
|---|---|---|---|
| 3,560,798 | 2/1971 | Plainfield | 361/73 |
| 4,084,204 | 4/1978 | Jacobus, Jr. | 361/72 |
| 4,330,702 | 5/1982 | Cheng | 99/281 X |
| 4,344,000 | 8/1982 | Schornack et al. | 307/141 X |
| 4,354,120 | 10/1982 | Schornack | 307/141 X |
| 4,406,217 | 9/1983 | Oota | 219/302 X |
| 4,412,481 | 11/1983 | Oota et al. | 99/285 X |
| 4,418,614 | 12/1983 | Oota et al. | 99/285 X |
| 4,468,406 | 8/1984 | d'Alayer de Costemore d'Are | 99/280 X |
| 4,566,802 | 1/1986 | Koehler | 368/9 |
| 4,644,571 | 2/1987 | Narita et al. | 99/280 X |
| 4,671,668 | 6/1987 | Narita et al. | 99/286 X |
| 4,695,683 | 9/1987 | Wingler et al. | 200/38 R |
| 4,697,930 | 10/1987 | Roberts et al. | 368/82 |

OTHER PUBLICATIONS

TMS 345ONL Led Duplex Digital Radio Clock, Integrated Circuit Data Sheets, pp. 143–156.

*Primary Examiner*—William M. Shoop, Jr.
*Assistant Examiner*—Paul Ip
*Attorney, Agent, or Firm*—Arnold, White & Durkee

[57] ABSTRACT

A hybrid analog and electronic cycle timer has a mechanical movement and cam-operated cycle switch driven by a low-RPM synchronous motor. Electronic control logic divides the power line frequency to obtain pulses for pulsing the synchronous motor. The control logic also includes an activation interval timer and a lockout flip-flop which inhibits the activation interval timer. The activation interval timer is otherwise triggered by closure of the cycle switch. The lockout flip-flop is set after a power failure and at the end of the activation interval, and is reset by a manual reset signal. The activation interval timer may include an activation enable flip-flop and an activation interval counter. The state of the control circuit is conveniently indicated by an indicator which is activated continuously during the activation interval, and which is activated intermittently when the activation interval timer is inhibited by the lockout flip-flop. The control logic is preferably included in a single CMOS integrated circuit.

25 Claims, 4 Drawing Sheets

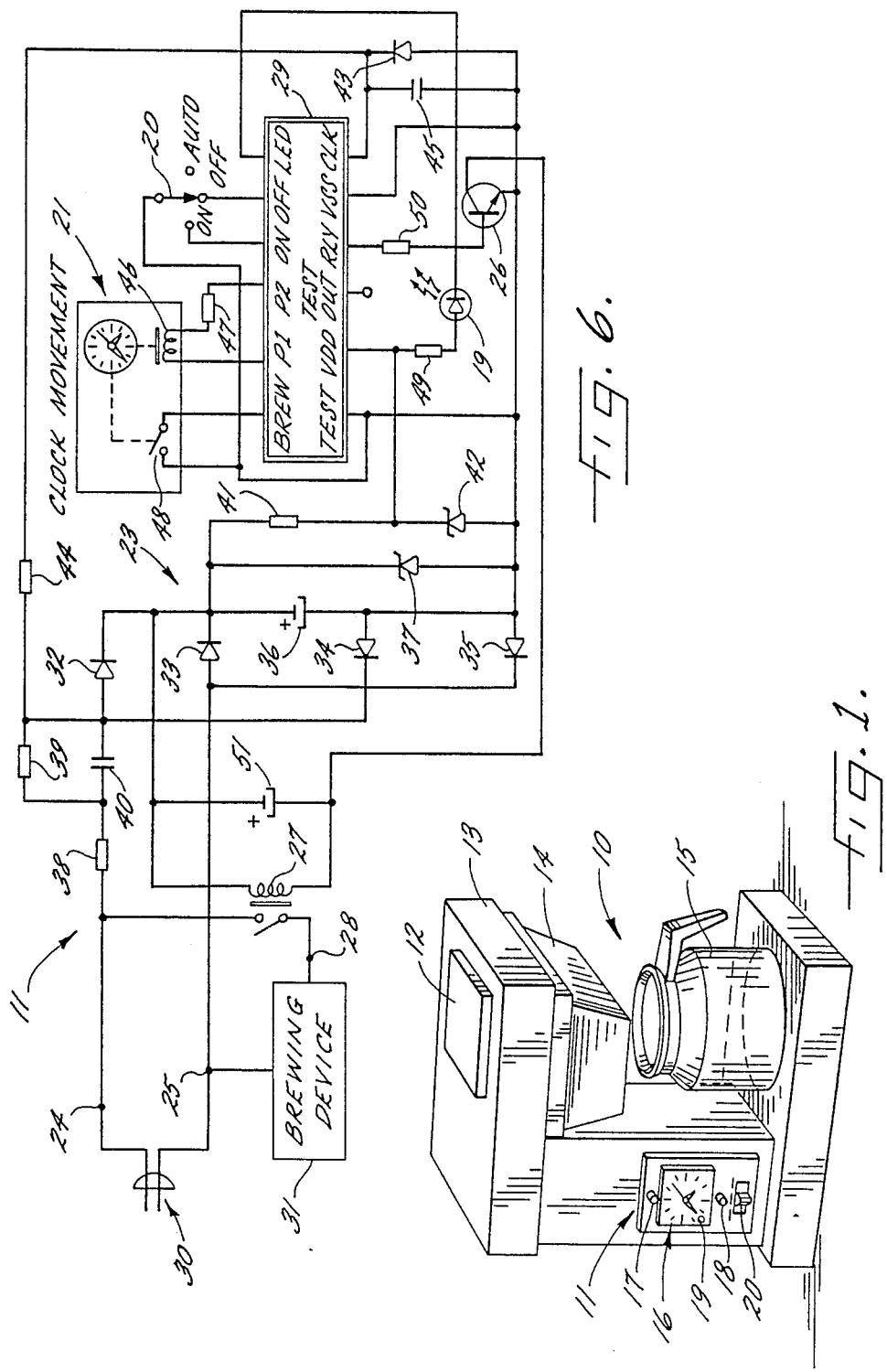

CYCLE TIMER FOR HOUSEHOLD APPLIANCE

BACKGROUND OF THE INVENTION

1. Field of the Invention

The present invention relates generally to cycle timers, and specifically to a cycle timer which activates a household appliance at a preset time of day.

2. Description of the Background Art

For automatic activation of household appliances such as coffee makers, cycle timers have been used which generate an activation signal at a preset time each day. The cycle timers have used either mechanical gear trains or electronic counting circuits to keep track of the time of day, and cam switches or numerical comparator circuits to generate the activation signal.

Typically the cycle timer has a switch with three positions, including an "ON" position, an "AUTO" position, and an "OFF" position. In the "AUTO" position, the cycle timer typically generates an activation signal having a duration of about 105 to 135 minutes starting when the time of day reaches the preset time. Electronic timers of this kind are described in U.S. Pat. Nos. 4,697,930 to Roberts et al. and 4,566,802 to Koehler.

Koehler U.S. Pat. No. 4,566,802 is specifically directed to the use of a bistable circuit for preventing an activation signal from being generated on a daily basis without manual intervention. For automatic coffee makers, such a "lockout" feature may prevent a fire from occurring, since repeated operation of the coffee maker with an empty water reservoir increases the likelihood of a fire.

In Koehler, the bistable circuit is set to activate an activation enable signal upon receipt of the cycle enable signal, and is reset by the activation signal to disable the activation enable signal. For a coffee maker, the bistable circuit is preferably reset by the activation signal at the active-to-inactive transition signalling the end of brewing. Preferably the bistable circuit is set by the "OFF" position of the three-position switch. Such a bistable circuit has been incorporated onto the same integrated circuit as the electronic counters for registering the time of day. In this case a "lockout" flip-flop has been used for the bistable circuit.

At one time the electronic cycle timer, with an LED or fluorescent digital display, was the most popular. Recently, however, analog display timers have come back in fashion. But consumers expect to have the same quality and features that are found in the electronic timers, such as twenty-four hour cycles instead of twelve-hour cycles. In response, manufacturers have offered improved mechanical movements. A mechanical movement has been introduced, for example, having a cam-operated switch to turn on a household appliance at a preset time of day and an automatic shut-off in which a cam mechanically moves the three-position manual switch from the automatic to the off position after a certain activation interval. Such a mechanism is disclosed in Wingler et al. U.S. Pat. No. 4,695,683. Such mechanisms, however, are subject to wear and variations in their timing intervals.

One successful attempt to improve the analog display timers involves the use of a quartz crystal, electronic oscillator and counter, and low-RPM synchronous motor. One such popular "quartz movement" is manufactured by Ikeda Bussan, Ltd. (New Tokyo Bldg. #3/1, Muranouchi 3-Chome, Chiyoda-Ku, Tokyo 100, Japan). Similar clock movements are offered by other manufacturers. The movement is virtually noiseless and very durable. Although the mechanism was originally designed to be battery powered and has low-voltage, low current switch contacts, it has been used as an appliance timer by the addition of a line-voltage driven power supply and a relay activated by the low-current switch contacts via a transistor current amplifier. Such a "hybrid" electronic and mechanical timer, however, is relatively expensive due to the cost of the quartz crystal. In addition, the timer does not have a "lockout" mechanism, and the duration of the activation interval is relatively imprecise.

SUMMARY OF THE INVENTION

Accordingly, the main objective of the present invention is to provide an economical cycle timer having an analog display but otherwise having all of the desirable features of an electronic cycle timer.

A specific object of the invention is to provide an analog display timer with a reliable automatic shut-off mechanism.

Another object of the invention is to provide a mechanism in an analog timer for inhibiting the activation signal in the event of a temporary power failure.

Still another object of the invention is to provide an improved way of indicating the state of a cycle timer having a "lockout" mechanism.

These and other objects of the invention are provided by a hybrid analog-electronic cycle timer having a mechanical movement and cam-operated cycle switch driven by a low-RPM synchronous motor, and electronic control logic for driving the synchronous motor in response to the power line frequency, for defining the duration of the activation signal, and for inhibiting the activation signal upon the occurrence of a temporary power failure and at the end of the activation interval in the absence of manual intervention. An indicator is used to signal the state of the electronic control logic by continuously activating the indicator when the activation signal is active, and by intermittently activating the indicator when the activation signal is inhibited.

BRIEF DESCRIPTION OF THE DRAWINGS

Other objects and advantages of the invention will become apparent upon reading the following detailed description and upon reference to the drawings in which:

FIG. 1 is a perspective view of a coffee maker including the cycle timer of the present invention;

FIG. 6 is a schematic diagram of the electrical circuits in the cycle timer;

Figure 4:
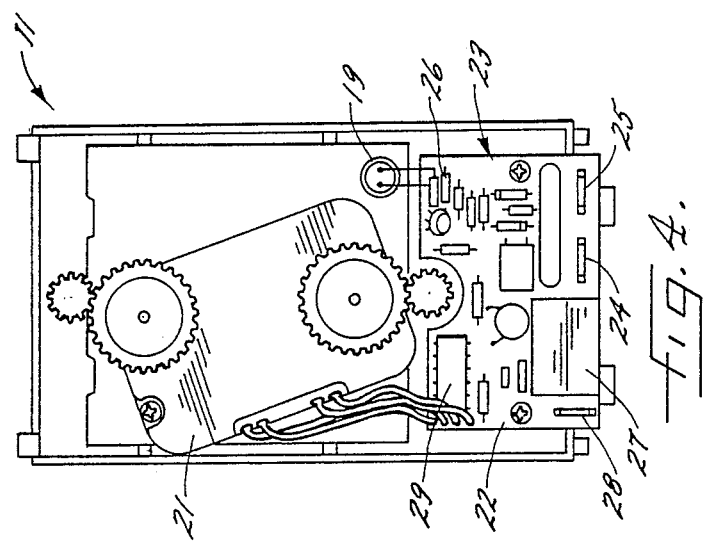
FIG. 4 is a rear view of the cycle timer.
Figure 3:
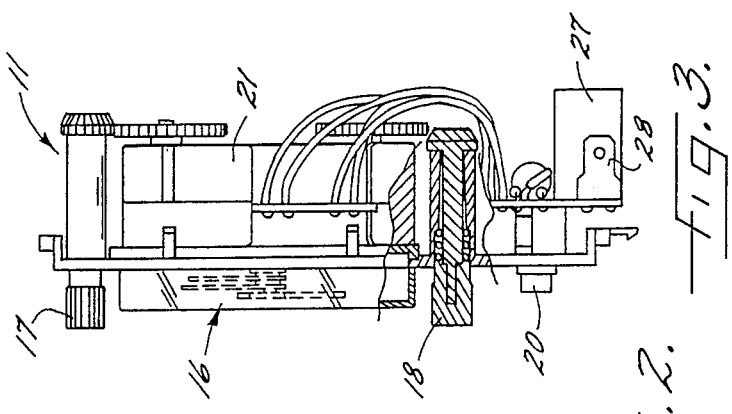
FIG. 3 is a side view of the cycle timer.
Figure 2:
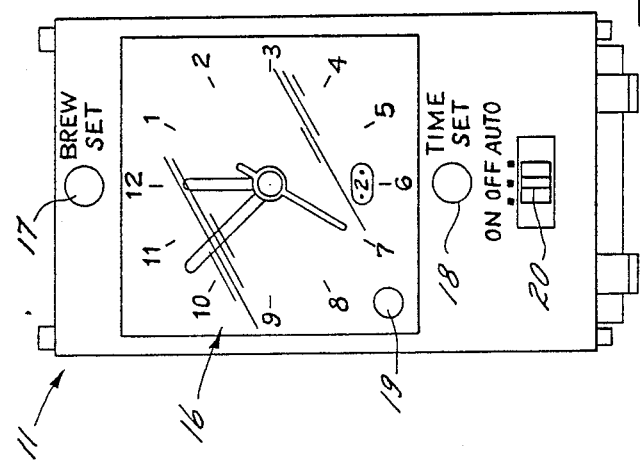
FIG. 2 is a front view of the cycle timer shown in FIG. 1.
Figure 5:
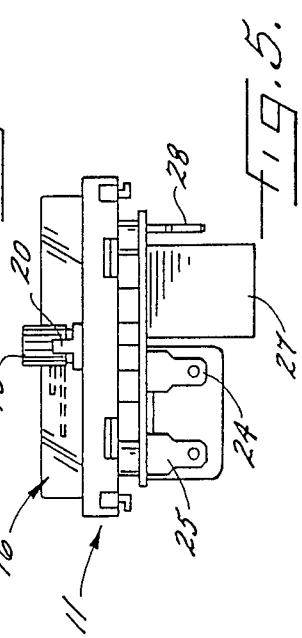
FIG. 5 is a bottom view of the cycle timer.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Turning now to the drawings, there is shown in FIG. 1 a coffee maker generally designated 10 including a cycle timer generally designated 11 according to the present invention. For the brewing of coffee, a cover 12 in the top portion 13 of the coffee maker 10 is opened to gain access to a water reservoir (not shown). After filling the reservoir with a certain amount of water, the cover 12 is replaced. Ground coffee and a coffee filter (not shown) are placed in a tray 14 which is inserted below the top portion 13. An internal heater or brewing device (not shown) is then activated to heat the water in the reservoir and then drip the hot water through the coffee in the tray 14. By the force of gravity, the brewed coffee drips from a center hole (not shown) in the tray 14 and is received in a flask 15.

In contrast to the old-fashioned percolator-type coffee maker, the drip-type coffee maker 10 does not boil the brewed coffee. Consequently, the brewed coffee retains many of the subtle flavors which are otherwise lost or destroyed by excessive heat which is applied in a percolator. The drip-type coffee maker 10 has enjoyed considerable commercial success as a household appliance as a result of consumers becoming aware of these advantages.

The drip-type coffee maker 10, however, has the disadvantage that the brewing process is slower than that required for an old-fashioned percolator. During the morning rush, household consumers usually do not have time to wait until the coffee is brewing in the drip-type coffee maker. So that a consumer may arise each morning to find a fresh, hot supply of brewed coffee awaiting, the cycle timer 11 is set to start the brewing process before the consumer arises. Of course, the consumer has the responsibility of previously loading the coffee maker 10 with water and ground coffee before retiring in the evening.

To enable the consumer to set the timer 11, the timer has a display 16 for indicating the time of day and the activation time, a knob 17 for setting the activation time, and a knob 18 for setting the time of day. The timer also has an indicator light 19 for signalling the state of the cycle timer as further described below. In addition, the cycle timer has a switch 20 with "ON", "OFF", and "AUTO" positions.

It is thought to be unsafe to operate the coffee maker 10 without first filling the unit with at least a certain amount of water. The water insures that the temperature of the heating element or brewing device (not shown) in the coffee maker 10 will not exceed the boiling point of water. If the temperatures in the coffee maker 10 exceed the boiling point of water, then there is a very small but finite chance that a fire may occur.

According to a basic aspect of the present invention, the cycle timer 11 is a hybrid analog and electronic timer having an analog display and also having electronic control circuitry which ensures that an unattended coffee maker 10 is not repeatedly activated. After filling the coffee maker with water and ground coffee, the user must supply a cycle enable signal, for example, by toggling the slide switch 20. Otherwise, the timer 11 will not activate the coffee maker for brewing. According to another aspect of the present invention, the electronic control circuitry prevents automatic brewing from occurring after a temporary power failure. Moreover, the indicator 19, which is on during brewing, flashes to tell the user that a cycle enable signal must be supplied.

Turning now to FIGS. 2-5, there are shown various views of the cycle timer 11. As more clearly shown in FIG. 4, the timer 11 includes a mechanical movement 21 which drives the analog display 16 and which has a cam-operated cycle switch which closes at a preset time every 24 hours. The cycle timer 11 further includes a circuit board 22 having a line-operated power supply generally designated 23 receiving line power on a pair of terminals 24 and 25. The circuit board 22 also includes a transistor 26 and a relay 27 for supplying a good deal of current to a terminal 28 in response to closure of the cycle switch (not shown) in the mechanical movement 21.

The movement 21 was originally manufactured and sold by Ikeda Bussan, Ltd. of Japan in the form of a battery operated quartz analog clock movement. In the prior art, this movement has been offered for sale as a cycle timer with an appearance similar to that shown in FIG. 2. In this case, a line-operated power supply was used to supply a low voltage to the mechanical movement in lieu of a battery, and a transistor and relay was used to switch a relatively high amount of current at the line voltage in response to closure of a cycle switch in the clock movement 21. Also, an indicator light was used to indicate whether the relay was energized. Moreover, a three-position switch was used to either turn the relay always on or always off, or to permit the cycle switch to activate the relay when the three-position switch was in the automatic position.

In accordance with the present invention, control logic, preferably in the form of an integrated circuit 29, is included to control the timer, as will be further described below. So that the use of such an integrated circuit can introduce a cost reduction, the quartz crystal, counter and associated electronic components that were previously used in the movement 21 are eliminated and replaced by pulse generating circuits included in the integrated circuit 29. This does not involve a loss of accuracy in time keeping, because the integrated circuit 29 generates pulses in response to the power line frequency.

Turning now to FIG. 6, there is shown a schematic diagram of the circuits for the cycle timer 11. A power line cord 30 is connected between terminals 24 and 25, and the brewing device or heating element 31 is connected between terminals 25 and 28. Therefore, the brewing device 31 is powered when the relay 27 is turned on.

The power supply 23 includes a bridge rectifier made up of directional diodes 32, 33, 34 and 35, such as part No. 1N4004. The direct current output is filtered by an electrolytic capacitor 36 which has, for example, a value of 10 microfarads. The output voltage is clamped to 15 volts by a zener diode 37 such as part No. 1N4744A. The rectifier diodes are energized from the terminals 24 and 25 via resistors 38, 39 and a capacitor 40. The resistor 38 preferably has a value of 47 ohms and the resistor 39 preferably has a value of 470 K ohms. The capacitor 40 is preferably a 0.68 or 1 microfarad capacitor rated at 250 volts. The capacitor 40 could be a non-polarized electrolytic capacitor.

In order to energize the integrated circuit 29, the 15 volts output across the zener diode 37 is dropped to 5.1 volts by a series resistor 41 and a 5.1 volt zener diode 42. The resistor 41 preferably has a value of 680 ohms, and the zener diode 42 is, for example, part No. 1N4733.

In order to provide a clocking signal to the integrated circuit 29, the alternating polarity signal across the rectifier diode bridge is clamped by a directional diode 43 working in connection with a series resistor 44 and a shunt capacitor 45. The diode 43, for example, is part No. 1N4148, the resistor 44 has a value of 100 K ohms and the capacitor 45 has a value of 0.01 microfarads.

The integrated circuit 29 generates a pair of phase-offset pulse trains on outputs P1 and P2 which energize the winding 46 of a synchronous motor in the clock movement 21. A resistor 47 is wired in series with the coil 46, and the resistor has a value, for example, of 3 K ohms.

The clock movement 21 includes a cycle switch 48 which closes at the preset time of day. The cycle switch 48 is wired to the BREW input of the integrated circuit 29, and is used in connection with the three-position switch 20 to generate a signal on the RLY output for activating the relay 27 and for generating a signal on the output LED for selectively activating the light-emitting diode 19. The light-emitting diode 19 is wired to the positive supply VDD through a series current limiting resistor 49 which has a value, for example, of 1.5 K ohms. The light-emitting diode is, for example, part No. TLR114A. The integrated circuit 29 is connected to the base of the transistor 26 through a current limiting resistor 50 which has a value, for example, of 390 ohms. The coil of the relay 27 is shunted by an electrolytic capacitor 51 which prevents transients when the transistor 26 turns off. The capacitor 51 has a value, for example, of 100 microfarads.

Figure 7:
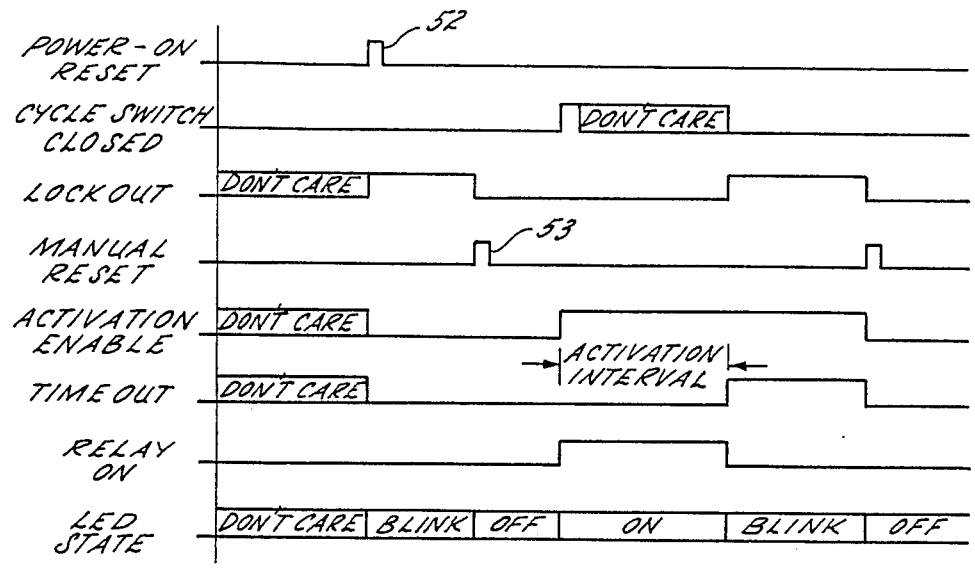
FIG. 7 is a timing diagram showing the operation of the cycle timer in the automatic mode.

Turning now to FIG. 7 there is shown a timing diagram which illustrates the operation of the lockout circuit and the indictor method of the present invention. In response to a power-on reset pulse 52, the control circuits in the integrated circuit 21 are set to an initial state characteristic of a power failure. In this state a lockout flip-flop (as further described below in connection with FIG. 8) generates an active lockout signal, an activation enable flip-flop is reset to generate an inactive activation enable signal, and an activation interval counter is reset to generate an inactive timeout signal. The activation enable flip-flop and the activation interval counter together function as an activation interval timer. The lockout signal is deactivated in response to a manual reset pulse 53. After the manual reset pulse, the circuits are ready for operation in the automatic mode. In this regard, it is assumed that the three-position switch 20 of FIG. 6 is in the automatic or "AUTO" position.

The start of the activation interval occurs when the cycle switch (48 in FIG. 6) becomes closed. At the instant of closure of cycle the switch, the activation enable flip-flop is set, the activation enable signal becomes active, and the relay (27 in FIG. 6) is turned on for the duration of the activation interval. The end of the activation interval is signalled by the timeout signal becoming active. When this occurs, the relay becomes turned off. Also, the lockout flip-flop is set to its active state upon the low to high transition of the timeout signal.

It should be noted that in the automatic mode of FIG. 7, the circuits have four distinct states. These states include the state occurring after the power-on reset, the state occurring after the manual reset, the activation interval when the relay is on, and the state after the activation interval and before any of the resets signals. In accordance with an important aspect of the invention, these states are signalled by an indicator which is either continuously on, continuously off, or on intermittently. In particular, the indicator blinks when the circuit must be manually reset to enable the relay to be turned on in the automatic mode. The indicator is continuously off after the circuits are manually reset, and the indicator is continuously turned on during the activation interval when the relay is on.

Figure 8:
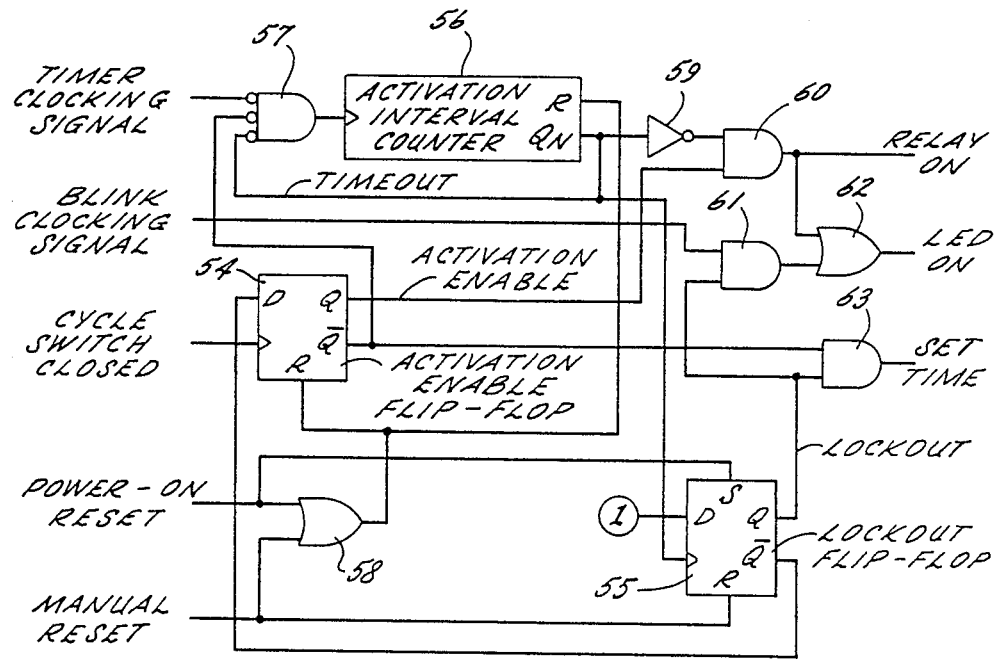
FIG. 8 is a simplified schematic diagram of control logic that could be used in the cycle timer.

Turning now to FIG. 8 there is shown a simplified schematic diagram of control circuits which are capable of functioning according to the timing diagram of FIG. 7. The activation enable signal is generated by a delay flip-flop 54 and the lockout signal is generated by a delay flip-flop 55. The timeout signal is generated by an activation interval counter 56. In order to enable the counter 56 with the activation enable signal, the Q complement signal from the flip-flop 54 is combined with a timer clocking signal in a NOR gate 57 to provide the clock input to the counter 56. Moreover, the timeout signal from the counter 56 is fed back to the gate 57 to hold the timeout signal in an active state until the counter 56 is reset. It should be apparent from the timing diagram of FIG. 7, that the counter 56 and the timer enable flip-flop 54 are reset by the power-on reset and also by the manual reset. Therefore, the reset inputs of the activation enable flip-flop 54 and the counter 56 are provided by a OR gate 58. The lockout flip-flop 55, on the other hand, is set by the power-on reset and reset by the manual reset.

In order to inhibit the activation signal from the cycle switch, the Q complement signal from the lockout flip-flop 55 is fed to the D input of the activation enable flip-flop 54. The activation enable flip-flop 54 is clocked in response to the cycle switch becoming closed. In order to set the lockout flip-flop 55 at the end of the activation interval, the lockout flip-flop has a logical one applied to its D input, and it is clocked by the rising edge of the timeout signal from the counter 56.

It should be evident from FIG. 7 that the relay should be turned on only when the activation enable is high and the timeout signal is low. Therefore, a RELAY ON signal can be provided by an inverter 59 and an AND gate 60. It is also evident from FIG. 7 that the light-emitting diode should blink only when the lockout signal is high, and it should be continuously on only when the relay is on. Therefore a LED ON signal can be provided by an AND gate 61 and an OR gate 62.

It should be noted that the light-emitting diode will blink both after a power failure as signalled by the power-on reset and at the end of the activation interval. The power-on reset condition can be distinguished by a "set time" signal provided by an AND gate 62 signalling that the lockout signal is active but the activation enable signal is inactive.

Figure 9:
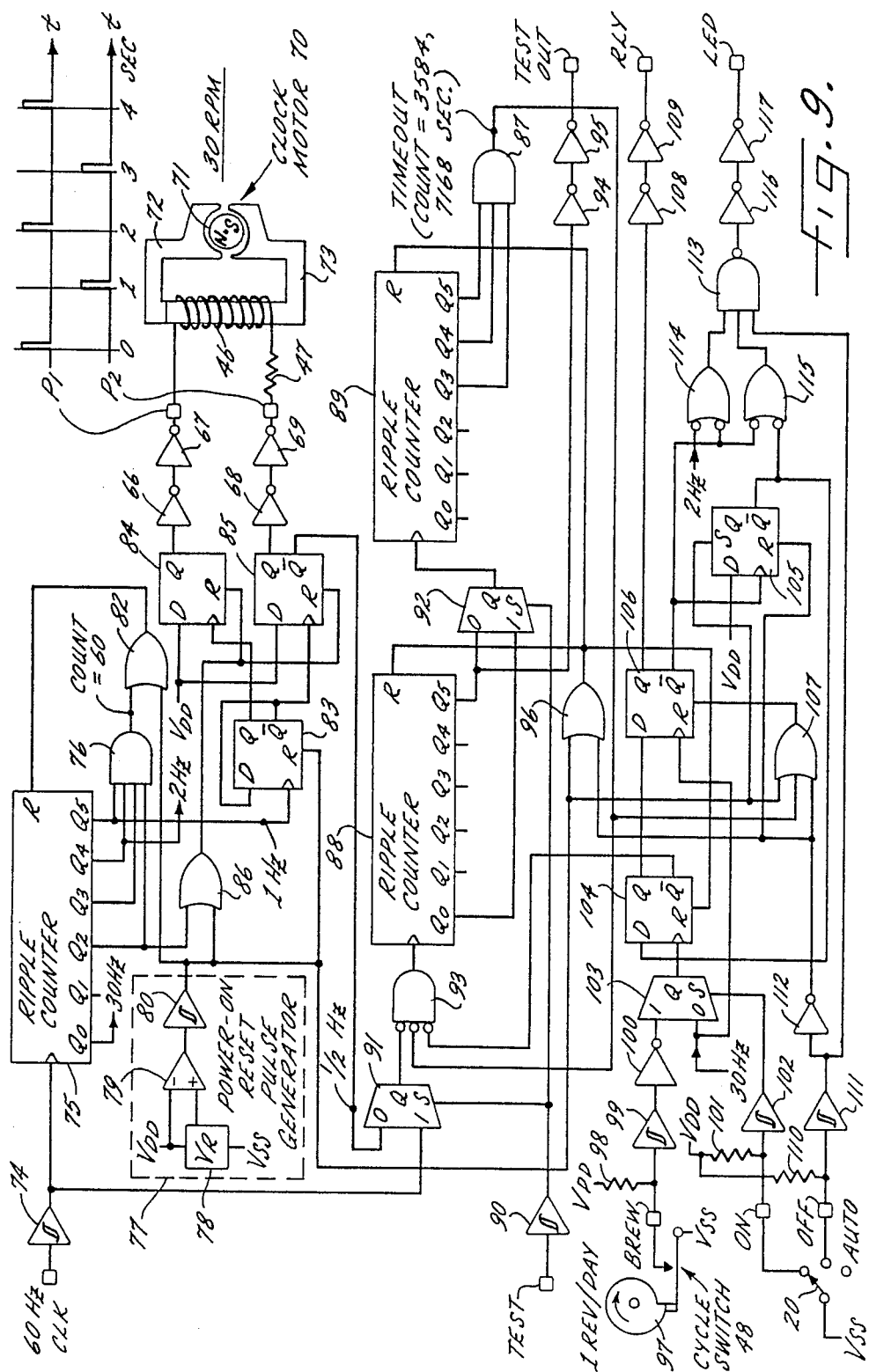
FIG. 9 is a detailed schematic diagram of the preferred control logic used in FIG. 6.

Turning now to FIG. 9, there is shown a detailed schematic diagram of the preferred circuits in the chip 29 of FIG. 6. These circuits preferably are comprised of CMOS logic components on a "cell array" chip manufactured by Motorola, Inc. of Schaumburg, Ill.

As introduced above, one of the functions of the integrated circuit 29 is to provide phase-offset pulse trains P1 and P2 for a low-RPM synchronous motor in the clock movement 21. As shown in FIG. 9, the clock motor 70 has a rotor 71 in the form of a cylindrical 2-pole magnet which is eccentrically mounted with respect to semicircular surfaces of respective pole pieces 72 and 73. In response to each one of the pulses P1 and P2, the poles of the magnet move from their respective adjacent pole pieces to their opposite pole pieces. The rotor continues to rotate due to its eccentric offset with respect to the pole pieces 72, 73. The frequency of each of the pulses P1 and P2 is $\frac{1}{2}$ Hz, so that the clock motor rotates at 30 revolutions per minute. Due to the fact that the coil 45 is energized by the pulses, the rotor 71 rotates intermittently at 180° intervals, causing the second hand of the clock display 16 to jump at 1-second intervals.

In order to generate the pulses P1 and P2, the 60 Hz signal on the CLK input is converted to a clocking signal by a Schmitt trigger 74, and the 60 Hz is divided down to 1 Hz by a six-stage binary ripple counter 75 which is reset each time it counts to 60. The terminal count is detected by a AND gate 76. The ripple counter 75 is also reset in response to a power-on reset signal generated by a power-on reset pulse generator 77 which includes a voltage reference 78, a comparator 79, and a Schmitt trigger 80. The power-on reset pulse is therefore active when the supply voltage is less than a predetermined reference value. An OR gate 82 combines the outputs of the AND gate 76 with the power-on reset signal in order to reset the ripple counter 75.

To provide the $\frac{1}{2}$ Hz frequency of the pulses, the 1 Hz signal from the ripple counter 75 is divided in half by a delay flip-flop 83 wired as a toggle flip-flop. The individual pulses are provided by respective delay flip-flops 84 and 85 which are set upon the respective positive and negative transitions of the $\frac{1}{2}$ Hz frequency, and are reset approximately 70 milliseconds after the transitions. Specifically, the flip-flops 84 and 85 receive a logical one from the VDD supply on their D inputs, and are clocked respectively by the Q and Q complement signals from the flip-flop 83. The flip-flops 84 and 85 are reset after a duration of 4 cycles of the 60 Hz clocking signal via OR gate 86 which combines the $Q_2$ output of ripple counter 75 with the power-on reset signal. The Q outputs of the flip-flops 84 and 85 are buffered by inverters 66, 67, 68 and 69 to drive the coil 46 of the clock motor 70.

The activation interval is preferably about two hours, which is conveniently counted by 12 binary ripple counter stages and by an AND gate 87 which detects when the three most significant stages become set; in other words, at a count of 3,584 or after 7,168 seconds. In order to speed up the testing of the integrated circuit, the 12 binary ripple counter stages are split-up into 2 six-stage counters 88 and 89. During normal operation these counter stages are clocked by a $\frac{1}{2}$ Hz signal from the flip-flop 85, but for testing, each one of the counters 88 and 89 are preferably clocked at a higher rate. For this purpose, a logical one is asserted on the TEST input, and it is fed through a Schmitt trigger 90 to multiplexers 91 and 92 which cause the ripple counter 88 to be clocked at the 60 Hz rate and the ripple counter 89 to be clocked at a 30 Hz rate, assuming that a 60 Hz clocking signal is applied to the CLK input. In practice, the clocking signal applied to the CLK input during testing can be very much greater than 60 Hz. It should be evident that the ripple counters 88 and 89 provide the counter function 56 of FIG. 8, and a NOR gate 93 is provided corresponding to the gate 57 of FIG. 8. During testing, the output of the ripple counter 88 is fed through a pair of inverters 94 and 95 to a TEST OUT pin. The ripple counters 88 and 89 are reset via an OR gate 96 corresponding to the gate 58 of FIG. 8.

The clock movement 21 includes the cycle switch 48 which is actuated by a cam 97 rotated at a rate of one revolution per day. When the cycle switch closes, it shunts the BREW input to VSS which is a logical zero. The BREW input is internally connected to a pull-up resistance 98, a Schmitt trigger 99 and an inverter 100.

The ON position of the three-position switch 20 is treated as if the cycle switch 47 were periodically opening and closing at a 30 Hz rate. For this purpose the ON input is connected to a pull-up resistance 101, a Schmitt trigger 102, and the select input S of a multiplexer 103 which selects either the output of the inverter 100 or a 30 Hz signal from the $Q_O$ output of the ripple counter 75. The Q output of the multiplexer 103 clocks an activation enable flip-flop 104 corresponding to the flip-flop 54 of FIG. 8.

The circuit in FIG. 9 includes a lockout flip-flop 105 corresponding to the flip-flop 55 of FIG. 8. The relay-on signal, however, is provided by a separate flip-flop 106 which samples the output of the flip-flop 104 and is reset in response to the timeout signal by virtue of an OR gate 107. The Q output of the flip-flop 106 is fed through a pair of inverters 108 and 109 to the RLY pin. Also it should be noted that in FIG. 9, the lockout flip-flop 105 is set when the Q complement output of the flip-flop 106 goes from low to high at the end of the activation interval.

The manual reset signal is provided by the OFF position of the three-position switch 20. The OFF pin is connected to a pull-up resistance 110, a Schmitt trigger 111, and an inverter 112 in order to provide the manual reset signal.

It should be noted that the signal on the LED pin is active low to turn on the LED 19 as wired in FIG. 6. Also, since the circuit in FIG. 9 must work for the on and off as well as the automatic mode, the LED must be turned off when the switch 20 is in the off position. For this reason, the signal to the LED pin is provided a NAND gate 113 and a pair of NAND gates 114 and 115. These gates ensure that after a power-on reset, the light-emitting diode flashes for the ON and AUTO positions, and is off for the OFF position. The gate 113 is connected to the LED pin by a pair of inverters 116 and 117.

In view of the above, there has been described an economical cycle timer having an analog display but also having the desirable features associated with electronic cycle timers. The cycle timer is compact, lightweight, and very durable. A low-power synchronous motor is pulsed at a 1 Hz rate obtained by dividing the power line frequency in order to provide accurate and noiseless time keeping. The pulses are generated by a control circuit which also precisely defines the activation interval and inhibits the activation signal after any power loss and after every cycle unless the timer is manually reset. The control circuit preferably includes an activation enable flip-flop, an activation interval counter, and a lockout flip-flop. The state of the control circuit is conveniently indicated by an indictor which flashes when the activation signal is inhibited, and is continuously on during the activation interval.

What is claimed is:

1. An electronic timer responsive to the occurrence of a selected time of day, said electronic timer comprising:
  (a) a mechanical clock movement driven by a synchronous motor and providing an analog display indicating the current time of day, said mechanical clock movement including a cycle switch sensing when the current time of day reaches said selected time of day, and
  (b) an electronic control circuit, said control circuit including an activation interval timer having an input responsive to said cycle switch, an output, and means for generating an activation signal on said output for a limited activation interval when said cycle switch senses that said current time of day reaches said selected time of day,
  wherein said timer further comprises a power line energized power supply for powering said control circuit, said power supply including means for providing a clocking signal at the power line frequency, and said control circuit includes a digital divider having an input for receiving said clock signal and an output or driving said synchronous motor in synchronism with said clocking signal.

2. The electronic timer as claimed in claim 1, wherein said control circuit is included in a single integrated circuit.

3. The electronic timer as claimed in claim 1, wherein said activation interval timer includes an activation interval counter for counting in response to said clocking signal.

4. The electronic timer as claimed in claim 3, wherein said activation interval timer includes an activation enable flip-flop having an output enabling said activation interval counter and a clock input responsive to said cycle switch sensing when the current time of day reaches said selected time of day.

5. An electronic timer responsive to the occurrence of a selected time of day, said electronic timer comprising:
  (a) a mechanical clock movement driven by a synchronous motor and providing an analog display indicating the current time of day, said mechanical clock movement including a cycle switch sensing when the current time of day reaches said selected time of day, and
  (b) an electronic control circuit, said control circuit including an activation interval timer having an input responsive to said cycle switch, an output, and means for generating an activation signal on said output for a limited activation interval when said cycle switch senses that said current time of day reaches said selected time of day, wherein said electronic control circuit further includes a lockout flip-flop having an output for selectively inhibiting said activation interval time, a set input responsive to said activation signal for inhibiting said activation interval timer at the end of said activation interval, and a reset input for receiving a manual reset signal for enabling said activation interval timer.

6. The electronic timer as claimed in claim 5, wherein said control circuit further includes means setting said lockout flip-flop after a temporary power loss for inhibiting said activation interval timer.

7. The electronic timer as claimed in claim 5, further comprising means for operating a single indicator to selectively indicate three distinct control states including a first state during the activation interval, a second state after the activation interval when said lockout flip-flop is inhibiting said activation interval timer, and a third state after the activation interval when said lockout flip-flop is not inhibiting said activation interval timer.

8. The electronic timer as claimed in claim 7, wherein said indicator appears to be activated continuously during said first state, said indicator appears to be activated intermittently during said second state, and said indicator does not appear to be activated during said third state.

9. The electronic timer as claimed in claim 8, wherein said indicator is a light-emitting diode that is on during said first state, flashing during said second state, and off during said third state.

10. An electronic timer responsive to the occurrence of a selected time of day, said electronic timer comprising:
  (a) a mechanical clock movement providing an analog display indicating the current time of day, said mechanical clock movement including a cycle switch sensing when the current time of day reaches said selected time of day, and
  (b) an electronic control circuit, said control circuit including means for generating an activation signal in response to said cycle switch, said means for generating an activation signal including bistable circuit means for inhibiting repeated generation of said activation signal in the absence of a manual reset signal, wherein said bistable circuit means includes a set input responsive to a power-on reset signal for inhibiting the generation of said activation signal after a temporary power failure, and a reset input responsive to a manual reset signal for enabling the generation of said activation signal after said manual reset signal.

11. An electronic timer responsive to the occurrence of a selected time of day, said electronic timer comprising:
  (a) a mechanical clock movement providing an analog display indicating the current time of day, said mechanical clock movement including a cycle switch sensing when the current time of day reaches said selected time of day, and
  (b) an electronic control circuit, said control circuit including means for generating an activation signal in response to said cycle switch, said means for generating an activation signal including bistable circuit means for inhibiting repeated generation of said activation signal in the absence of a manual reset signal, wherein said electronic control circuit further includes means for operating a single indicator to selectively indicate three distinct control states including a first state when the activation signal is active, a second state when the activation signal is inactive and said bistable circuit means is inhibiting said activation signal, and a third state when the activation signal is inactive and said bistable circuit means is not inhibiting said activation signal.

12. The electronic timer as claimed in claim 11, wherein said indicator appears to be activate continuously during said first state, said indicator appears to be activated intermittently during said second state, and said indicator does not appear to be activated during said third state.

13. The electronic timer as claimed in claim 12, wherein said indicator is a light-emitting diode that is on during said first state, flashing during said second state, and off during said third state.

14. A control arrangement for a cycle timer, said control arrangement comprising, in combination, bistable means for inhibiting repeated cycles of a periodic activation signal in the absence of manual intervention, and circuit means for operating a single indicator to selectively indicate three distinct states of said timer, said states including a first state when said activation signal is active, a second state when said activation signal is inactive and said bistable means is inhibiting said activation signal, and a third state when the activation signal is inactive and said bistable means is not inhibiting said activation signal.

15. The electronic cycle timer as claimed in claim 14, wherein said indicator appears to be activated continuously during said first state, said indicator appears to be activated intermittently during said second state, and said indicator does not appear to be activated during said third state.

16. The electronic cycle timer as claimed in claim 15, wherein said indicator is a light-emitting diode that is on during said first state, flashing during said second state, and off during said third state.

17. A method of operating a single electrical indicator to indicate three distinct states of a cycle timer of the kind which is capable of generating an activation signal on a periodic basis but requires manual intervention after each cycle to enable generation of another cycle of the activation signal, said method comprising the steps of:
   (1) operating said indicator in a first mode when said activation signal is active;
   (2) operating said indicator in a second mode when said activation signal is inactive and generation of another cycle of the activation signal is not, enabled, and
   (3) operating said indicator in a third mode when said activation signal is inactive, and generation of another cycle of the activation enable signal is enabled,
   wherein said first, second and third modes cause said indicator to have three respective visually distinct appearances.

18. The method as claimed in claim 17, wherein said indicator appears to be activated continuously in said first mode, said indicator appears to be activated intermittently in said second mode, and said indicator does not appear to be activated in said third mode.

19. The method as claimed in claim 19, wherein said indicator is a light-emitting diode that appears to be on in said first mode, appears to flash in said second mode, and appears to be off in said third mode.

20. An electronic timer responsive to the occurrence of a selected time of day comprising:
   (a) a mechanical clock movement driven by a synchronous motor and providing an analog display indicating the current time of day, said synchronous motor including a rotor and means for causing said rotor to rotate intermittently in response to electrical pulses, said mechanical clock movement including a cycle switch sensing when the current time of day reaches said selected time of day, and
   (b) an electronic control circuit, said electronic control circuit including means for generating said electrical pulses at a periodic rate, and an activation interval timer having an input responsive to said cycle switch, an output, and means for generating an activation signal on said output for a limited activation interval when said cycle switch senses that said current time of day reaches said selected time of day.

21. The electronic timer as claimed in claim 20, wherein said periodic rate is one hertz to cause said rotor to rotate intermittently at one second intervals.

22. The electronic timer as claimed in claim 20, wherein said control circuit is included in a single integrated circuit.

23. An electronic timer responsive to the occurrence of a selected time of day comprising:
   (a) a mechanical clock movement driven by a synchronous motor and providing an analog display indicating the current time of day, said synchronous motor including a rotor and means for causing said rotor to rotate intermittently in response to electrical pulses, said mechanical clock movement including a cycle switch sensing when the current time of day reaches said selected time of day, and
   (b) an electronic control circuit, said electronic control circuit including means for generating said electrical pulses at a periodic rate, and means for generating an activation signal in response to said cycle switch, wherein said means for generating an activation signal includes bistable circuit means for inhibiting repeated generation of said activation signal in the absence of a manual reset signal.

24. The electronic timer as claimed in claim 23, wherein said means for generating an activation signal includes an activation interval timer having an input responsive to said cycle switch when enabled by said bistable circuit means, and an output providing said activation signal.

25. The electronic timer as claimed in claim 23, wherein said bistable circuit means includes a flip-flop having an input responsive to the active-to-inactive transition of said activation signal.

* * * * *

UNITED STATES PATENT AND TRADEMARK OFFICE
CERTIFICATE OF CORRECTION

PATENT NO. : 4,857,758
DATED : Aug. 15, 1989
INVENTOR(S) : Anthony W. Rigazio & Gerald C. Koehler It is certified that error appears in the above-identified patent and that said Letters Patent is hereby corrected as shown below:

In Col. 4, Ln. 60, please change "IN4004" to --1N4004--.
In Col. 9, Ln. 22, please change "clock" to --clocking--.
In Col. 9, Ln. 23, please change "or" to --for--.
In Col. 9, Ln. 63, before "setting", please insert --for--.
In Col. 10, Ln. 64, please change "activate" to --activated--.
In Col. 11, Ln. 40, after "not", please cancel ",".
In Col. 11, Ln. 43, after "inactive" please cancel ",".
In Col. 11, Ln. 55, please change "claim 19" to --claim 18--.

Signed and Sealed this

Eleventh Day of September, 1990

*Attest:*

HARRY F. MANBECK, JR.

*Attesting Officer*     *Commissioner of Patents and Trademarks*